(12) United States Patent
Lee et al.

(10) Patent No.: US 7,837,819 B2
(45) Date of Patent: Nov. 23, 2010

(54) METHOD OF MANUFACTURING MEMBRANE-ELECTRODE ASSEMBLY FOR FUEL CELL

(75) Inventors: Ki Sub Lee, Seoul (KR); Young Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 475 days.

(21) Appl. No.: 12/001,657

(22) Filed: Dec. 11, 2007

(65) Prior Publication Data

US 2009/0065127 A1 Mar. 12, 2009

(30) Foreign Application Priority Data

Sep. 7, 2007 (KR) ........................ 10-2007-0090741

(51) Int. Cl.
| | |
|---|---|
| B29C 65/48 | (2006.01) |
| B32B 37/04 | (2006.01) |
| B32B 37/22 | (2006.01) |
| B32B 38/10 | (2006.01) |
| C08J 5/00 | (2006.01) |
| C09J 5/02 | (2006.01) |
| H01M 8/00 | (2006.01) |
| H01M 4/00 | (2006.01) |

(52) U.S. Cl. ................ 156/247; 156/249; 156/278; 156/279; 156/280; 156/307.1; 156/307.3; 156/308.2; 156/309.6; 156/344; 429/12; 429/40; 429/42

(58) Field of Classification Search ............... 156/247, 156/249, 278–280, 307.1, 307.3, 308.2, 309.6, 156/344; 429/12, 40, 42
See application file for complete search history.

(56) References Cited

U.S. PATENT DOCUMENTS 4,894,355 A * 1/1990 Takeuchi et al. ............ 502/101

(Continued)

FOREIGN PATENT DOCUMENTS

JP 2004186143 A * 7/2004

(Continued)

OTHER PUBLICATIONS

English Abstract of JP 2009-272136.*

(Continued)

*Primary Examiner*—Philip C Tucker
*Assistant Examiner*—Sing P Chan
(74) *Attorney, Agent, or Firm*—Edwards Angell Palmer & Dodge LLP; Peter F. Corless

(57) ABSTRACT

The present invention provides a method of manufacturing a membrane-electrode assembly for a fuel cell, in which a binder is spray-coated on a surface of a polymer film, a catalyst slurry is bar-coated on a surface of an electrolyte membrane, bonded on the binder, to form a catalyst electrode layer, a bonded assembly of the electrolyte membrane and the catalyst electrode layer is separated from the polymer film, after a drying process, to obtain a 2-layer MEA, and the thus obtained 2-layer MEAs are used to form a 3-layer MEA or a 5-layer MEA by a hot pressing process. Accordingly, the present methods solve the problems associated with prior art that the loss of catalyst is considerable, since the catalyst slurry is directly spray-coated on the membrane, and the catalyst electrode layer in a solid phase is hot-pressed on both surfaces of the membrane.

6 Claims, 5 Drawing Sheets

U.S. PATENT DOCUMENTS

| | | | | |
|---|---|---|---|---|
| 5,336,570 A * | 8/1994 | Dodge, Jr. | | 429/31 |
| 5,521,020 A * | 5/1996 | Dhar | | 429/42 |
| 5,607,785 A * | 3/1997 | Tozawa et al. | | 429/33 |
| 5,702,839 A * | 12/1997 | Frost et al. | | 429/42 |
| 5,718,984 A * | 2/1998 | Iwase et al. | | 429/49 |
| 5,728,485 A * | 3/1998 | Watanabe et al. | | 429/41 |
| 5,879,827 A * | 3/1999 | Debe et al. | | 429/40 |
| 5,879,828 A * | 3/1999 | Debe et al. | | 429/41 |
| 6,010,606 A * | 1/2000 | Denton et al. | | 204/284 |
| 6,042,656 A * | 3/2000 | Knutson | | 134/21 |
| 6,074,691 A * | 6/2000 | Schmitt et al. | | 427/8 |
| 6,136,412 A * | 10/2000 | Spiewak et al. | | 428/143 |
| 6,180,276 B1 * | 1/2001 | Kim et al. | | 429/41 |
| 6,238,534 B1 * | 5/2001 | Mao et al. | | 204/416 |
| 6,277,447 B1 * | 8/2001 | Chun et al. | | 427/115 |
| 6,291,091 B1 * | 9/2001 | Preischl et al. | | 429/30 |
| 6,344,428 B1 * | 2/2002 | Lim et al. | | 502/101 |
| 6,391,486 B1 | 5/2002 | Narayanan et al. | | |
| 6,403,245 B1 * | 6/2002 | Hunt | | 429/33 |
| 6,425,993 B1 * | 7/2002 | Debe et al. | | 204/296 |
| 6,524,736 B1 * | 2/2003 | Sompalli et al. | | 429/42 |
| 6,645,660 B2 * | 11/2003 | Datz et al. | | 429/42 |
| 6,933,003 B2 * | 8/2005 | Yan | | 427/115 |
| 6,946,211 B1 * | 9/2005 | Bjerrum et al. | | 429/33 |
| 6,977,234 B2 * | 12/2005 | Kosako et al. | | 502/101 |
| 6,991,870 B2 * | 1/2006 | Yasumoto et al. | | 429/44 |
| 7,094,489 B2 * | 8/2006 | Shinn et al. | | 429/30 |
| 7,094,492 B2 * | 8/2006 | Matsubara et al. | | 429/40 |
| 7,098,163 B2 * | 8/2006 | Hampden-Smith et al. | | 502/101 |
| 7,175,930 B2 * | 2/2007 | Srinivas | | 429/33 |
| 7,226,689 B2 * | 6/2007 | Ye et al. | | 429/40 |
| 7,250,232 B2 * | 7/2007 | Boysen et al. | | 429/33 |
| 7,285,354 B2 * | 10/2007 | Ueyama et al. | | 429/44 |
| 7,371,480 B2 * | 5/2008 | Ono et al. | | 429/33 |
| 2002/0144394 A1 * | 10/2002 | Uchida et al. | | 29/623.5 |
| 2003/0078157 A1 * | 4/2003 | Matsuoka et al. | | 502/101 |
| 2003/0114297 A1 * | 6/2003 | Shinn et al. | | 502/159 |
| 2003/0158273 A1 * | 8/2003 | Kosako et al. | | 521/27 |
| 2004/0086632 A1 * | 5/2004 | Vlajnic et al. | | 427/115 |
| 2004/0096731 A1 * | 5/2004 | Hama et al. | | 429/44 |
| 2004/0247991 A1 * | 12/2004 | Suzuki et al. | | 429/44 |
| 2004/0258979 A1 * | 12/2004 | Ye et al. | | 429/44 |
| 2006/0110632 A1 * | 5/2006 | Hong et al. | | 429/12 |
| 2007/0072036 A1 * | 3/2007 | Berta et al. | | 429/33 |
| 2007/0122684 A1 * | 5/2007 | Song | | 429/40 |
| 2007/0166594 A1 * | 7/2007 | Hama et al. | | 429/33 |
| 2008/0102341 A1 * | 5/2008 | Lee | | 429/33 |
| 2008/0102349 A1 * | 5/2008 | Lee | | 429/40 |
| 2008/0292942 A1 * | 11/2008 | You et al. | | 429/40 |

FOREIGN PATENT DOCUMENTS

| | | |
|---|---|---|
| JP | 2004-221056 | 8/2004 |
| JP | 2006-331717 | 12/2006 |
| JP | 2007-012424 | 1/2007 |
| JP | 2007-115532 | 5/2007 |
| JP | 2009272136 A * | 11/2009 |
| KR | 10-2002-0084217 | 11/2002 |
| KR | 10-2002-0092467 | 12/2002 |
| KR | 10-20070039360 | 4/2007 |

OTHER PUBLICATIONS

English Abstract of JP 2004-186143.*

* cited by examiner

METHOD OF MANUFACTURING MEMBRANE-ELECTRODE ASSEMBLY FOR FUEL CELL

CROSS-REFERENCE TO RELATED APPLICATION

This application claims the benefit under 35 U.S.C. §119(a) on Korean Patent Application No. 10-2007-0090741, filed on Sep. 7, 2007, the entire contents of which are incorporated herein by reference.

BACKGROUND (a) Technical Field

The present invention relates to a method of manufacturing a membrane-electrode assembly (MEA) for a fuel cell. More particularly, the present invention relates to a method of manufacturing a 3-layer MEA in which a catalyst electrode layer is stacked on both surfaces of a membrane, and a method of manufacturing a 5-layer MEA in which gas diffusion layers (GDL) are stacked on both surfaces of a membrane with catalyst electrode layers disposed thereon.

(b) Background Art

In general, fuel cells are devices that convert the chemical energy of fuel directly into electrical energy by an electrochemical reaction of fuel and oxygen in air without combustion. Such fuel cells have attracted much attention as a zero emission power generation system and can be applied to the supply of electrical power for small-sized electrical/electronic devices, especially, portable devices, as well as to the supply of electrical power for industry, home, and vehicle.

A polymer electrolyte membrane fuel cell (PEMFC) has advantages of higher output density, faster response, and simpler system configuration, and thus extensive research for using the PEMFC as a vehicle power source or a stationary power generation system has continued to progress.

The PEMFC includes a membrane-electrode assembly (MEA), which is a major component and positioned at the most inner portion. The MEA includes an anode, a cathode and an electrolyte membrane disposed therebetween.

Referring to FIG. 1, catalyst electrode layers 3, i.e., the anode and the cathode are formed by uniformly coating a desired amount of catalyst on both surfaces of a polymer electrolyte membrane 4. Gas diffusion layers (GDLs) 2 are positioned at the outside of the MEA, i.e., on the surfaces where the catalyst is present, and separators 1 having flow fields for supplying fuel and exhausting water produced by the reaction are positioned at the outside of the GDL 2.

In general, a unit cell of the PEMFC includes one polymer electrolyte membrane, two catalyst electrode layers, two GDLs, and two separators. A plurality of such unit cells are stacked to form a fuel cell stack of a desired scale.

In the MEA, an oxidation reaction of hydrogen occurs at the anode of the fuel cell to produce hydrogen ions and electrons. The thus produced hydrogen ions and electrons are transferred to the cathode through the polymer electrolyte membrane and a conducting wire, respectively.

At the same time, a reduction reaction of oxygen occurs at the cathode receiving the hydrogen ions and electrons from the anode to produce water. Here, electrical energy is generated by the flow of the electrons through the conducting wire and by the flow of the protons through the polymer electrolyte membrane.

The MEAs are generally classified into a 3-layer MEA and a 5-layer MEA. The 3-layer MEA includes an electrolyte membrane and catalyst electrode layers disposed thereon. The 5-layer MEA includes an electrolyte membrane, catalyst electrode layers and gas diffusion layers. Conventionally, the 5-layer MEA is formed by bonding gas diffusion electrodes (GDEs) to both sides of the electrolyte membrane using a hot pressing process.

It is known that the performance of 3-layer MEA is better than that of the 5-layer MEA under the same conditions. The reason for this is that the interfacial resistance between the electrolyte membrane and the catalyst electrode layer of the 3-layer MEA is lower than that of the 5-layer MEA.

The interfacial resistance between the electrolyte membrane and the catalyst electrode layer has a direct effect on the MEA performance, and the MEA performance has a direct effect on the fuel cell performance. Accordingly, it is understood that, if the interfacial resistance of the MEA is reduced, it is possible to improve the fuel cell performance remarkably.

A typical method of manufacturing a 3-layer MEA is catalyst-coated membrane (CCM) method in which catalyst is coated on an electrolyte membrane. A typical method of manufacturing a 5-layer MEA is catalyst-coated GDL (CCG) method in which catalyst is coated on GDLs to form an anode and a cathode and the catalyst-coated GDL is bonded to a polymer electrolyte membrane.

In more detail, the 3-layer MEA is manufactured in such a manner that a catalyst slurry of low concentration is directly spray-coated on the electrolyte membrane using a spray gun to form a catalyst electrode layer, or the catalyst slurry is coated on a film and then subjected to a decal method. In the decal method, a polymer film as a release film coated with the catalyst slurry is hot-pressed onto a membrane such that an electrode is transferred onto the membrane.

The 3-layer MEA manufactured by directly spray-coating the catalyst on the membrane has an advantage that it is possible to minimize the interfacial resistance between the catalyst electrode layer and the membrane; however, since the catalyst slurry of low concentration should be spray-coated repeatedly on the membrane, it takes a long processing time and there is inevitably a loss of the expensive catalyst in terms of the spray process characteristics.

Moreover, it is not easy to directly spray-coat the catalyst on the membrane, and the coating method is limited only to the spray coating method. The reason for this is that, if the membrane is in direct contact with a solvent contained in the catalyst slurry, the membrane is swollen and deformed. Thus, it is difficult to directly spray-coat the catalyst on the membrane by other methods.

In the event that the catalyst is directly spray-coated on the surface of the membrane using the spray coating method, the solvent should be removed repeatedly after the direct spray-coating in order to reduce the amount of solvent coming in contact with the membrane, prevent the catalyst electrode layer from being cracked, and minimize the deformation of the membrane.

In the event that other methods are employed, since a large amount of solvent present in the catalyst slurry is in direct contact with the membrane, the membrane is deformed, the catalyst electrode layer is not formed uniformly, and thus it is impossible to manufacture the MEA.

For such reasons, the following method is generally used. That is, the catalyst is coated on a release film, in which no deformation is caused by the solvent, using a spray, a screen printing, or a casting knife and dried at a high temperature. Then, the resulting release film is placed on the membrane and pressed at a high temperature and pressure, thus transferring the catalyst electrode layer coated on the release film to the membrane.

Such a method is called a decal method. The decal method has an advantage in that the release film may not be deformed by the solvent since the catalyst electrode layer is coated on the release film. However, since it employs the release film, the manufacturing cost is increased and it additionally requires the pressing process, compared with the method of direct spray-coating the catalyst on the membrane.

Moreover, the decal method has another disadvantage in that, since the catalyst electrode layer in a solid phase, from which the solvent is removed, is transferred to the membrane, the contact area between the catalyst electrode layer and the membrane is reduced, and the interfacial resistance is increased, compared with the direct coating method.

FIG. 2 is a schematic diagram illustrating a conventional process of forming a catalyst slurry on a release film. As shown in the figure, a catalyst slurry 13 is coated on a polymer film 11 as a release film using a casting knife in the shape of a bar or an applicator 12. Since the above components have a flat film surface and a micro-scale gap, the catalyst slurry 13 is passed through the gaps and coated by the thickness of the gap, thus forming a catalyst electrode layer 13' having a small thickness on the polymer film 11.

Such a method of coating the catalyst slurry on the film surface is called a casting or bar coating method.

FIG. 3 is a schematic diagram illustrating a conventional hot pressing process, in which a release film 11 including a catalyst electrode layer 13' is compressed on both surfaces of a membrane 14, respectively, by applying heat to transfer the catalyst electrode layers 13' on the membrane 14, and FIG. 4 is a diagram illustrating a configuration of a 3-layer MEA manufactured by the decal method.

According to the conventional MEA manufacturing methods using the bar coating and decal methods of FIGS. 2 to 4, the catalyst slurry is placed on the expensive polymer film 11 such as polyethyleneimine (PEI), silicon coated polyethyleneterephthalate (PET), and polytetrafluoroethylene (PTFE) coating film and, then, the applicator 12 is moved in the casting direction to coat the catalyst slurry 13 on the polymer film 11 in a constant thickness.

At this time, the thickness of the coated catalyst slurry 13 can be adjusted by the applicator 12.

After the catalyst slurry is coated, the resulting polymer film 11 is dried in an oven at 60° C. to 100° C. for 30 minutes to completely remove the solvent contained in the catalyst slurry 13. The dried polymer film 11 is placed on both surfaces of the membrane 14 and subjected to the hot pressing process at 100° C. to 150° C. for 1 to 5 minutes, thus forming a 3-layer MEA (from which the polymer film is to be removed).

In the thus formed 3-layer MEA of FIG. 4, since the catalyst electrode layer 13' in a solid phase, from which the solvent is completely removed, is transferred to the membrane 14, the interfacial adhesion between the catalyst electrode layer 13' and the membrane 14 is reduced compared with the direct coating method, and the manufacturing cost is increased due to the use of expensive release film.

Meanwhile, the 5-layer MEA is manufactured in such a manner that an electrolyte membrane is disposed between two gas diffusion electrodes (GDEs) and pressed at a high temperature and high pressure, in which each of the GDEs is prepared by directly coating the catalyst on a GDL.

The thus formed 5-layer MEA has an advantage of a simpler manufacturing process; however, since the catalyst electrode layer and the membrane in the same solid phase are bonded to each other by the hot pressing process, the contact area between the catalyst electrode layer and the membrane is reduced and thus the interfacial resistance is increased more than that of the 3-layer MEA.

Moreover, it has a further drawback in that the method of coating the catalyst slurry on the GDL is limited to the spray coating method in which the loss of catalyst is considerable.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a method of manufacturing an MEA for a fuel cell, which can provide a simpler process, reduce the loss of catalyst, provide an MEA with improved performance, and reduce the manufacturing time and cost.

In one aspect, the present invention provides a method of manufacturing a membrane-electrode assembly for a fuel cell, the method comprising: spray-coating a binder on a surface of a polymer film; placing an electrolyte membrane on the binder-coated polymer film and then heating and compressing them to bond the electrolyte membrane to the polymer film by the binder; coating a catalyst slurry on a surface of the electrolyte membrane to form a catalyst electrode layer; separating a bonded assembly of the electrolyte membrane and the catalyst electrode layer from the polymer film, after a drying process, to obtain a 2-layer membrane-electrode assembly; and stacking two of the 2-layer membrane-electrode assemblies such that the electrolyte membranes thereof face each other and then heating and compressing them to form a 3-layer membrane-electrode assembly.

In another aspect, the present invention provides a method of manufacturing a membrane-electrode assembly for a fuel cell, the method comprising: spray-coating a binder on a surface of a polymer film; placing an electrolyte membrane on the binder-coated polymer film and then heating and compressing them to bond the electrolyte membrane to the polymer film by the binder; coating a catalyst slurry on a surface of the electrolyte membrane to form a catalyst electrode layer; separating a bonded assembly of the electrolyte membrane and the catalyst electrode layer from the polymer film, after a drying process, to obtain a 2-layer membrane-electrode assembly; and disposing the 2-layer membrane-electrode assembly between a gas diffusion layer and a gas diffusion electrode prepared by stacking a catalyst electrode layer on a surface of another gas diffusion layer and then heating and compressing them to form a 5-layer membrane-electrode assembly.

Preferably, the polymer film is formed of a material selected from the group consisting of polyethyleneterephthalate, polyvinylchloride, polyimide, poly(aryl-ether-ether-ketone), polyurethane, polysulfone, and polytetrafluoroethylene.

Suitably, the binder is formed of a material selected from the group consisting of perfluorosulfonic acid, polytetrafluoroethylene, perfluorocarboxylic acid, sulfonated poly(aryl-ether-ether-ketone), sulfonated polysulfone, and sulfonated polyimide.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

Figure 1:
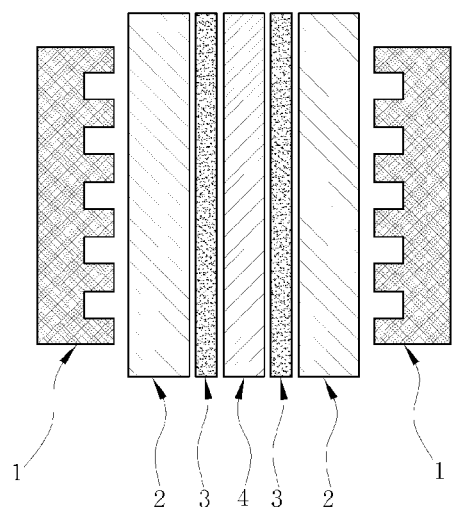
FIG. 1 is a diagram illustrating a general configuration of a unit cell of a fuel cell.
Figure 2:
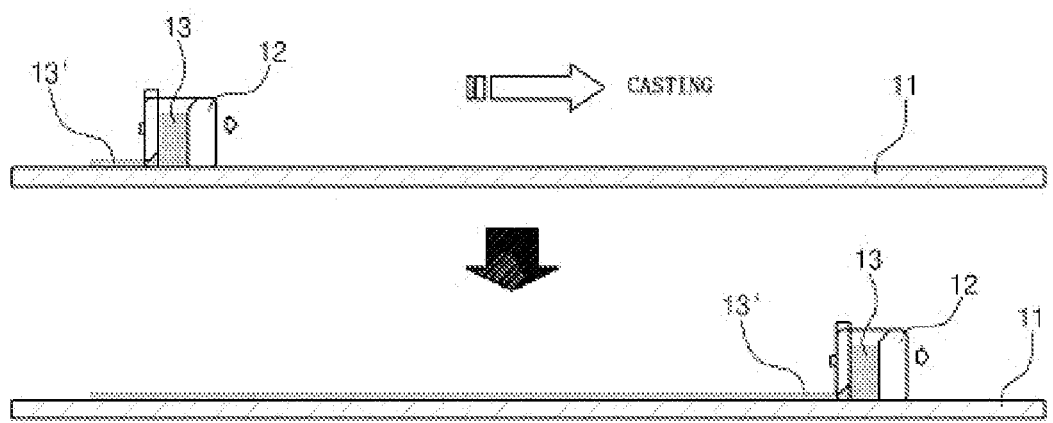
FIG. 2 is a schematic diagram illustrating a conventional process of forming a catalyst slurry on a release film.
Figure 3:
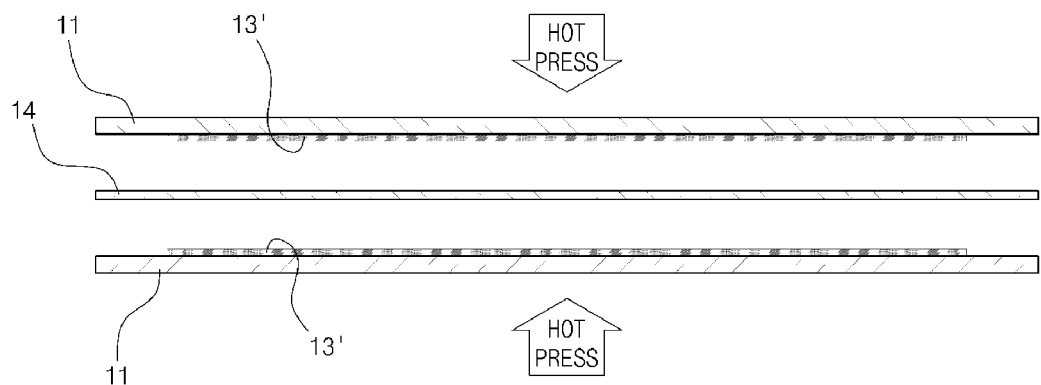
FIG. 3 is a schematic diagram illustrating a conventional hot pressing process, in which a release film including a catalyst electrode layer is compressed on both surfaces of an electrode membrane, respectively, by applying heat to transfer the catalyst electrode layers on the electrode membrane.
Figure 4:
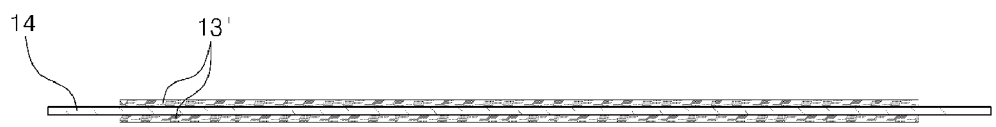
FIG. 4 is a diagram illustrating a configuration of a 3-layer MEA manufactured by a decal method.

Reference numerals set forth in the Drawings includes reference to the following elements as further discussed below:

| 11: release film | 12: applicator |
| 13: catalyst slurry | 13' catalyst electrode layer |
| 14: electrolyte membrane | 15: polymer film |
| 16: spray gun | 17: binder |
| 18: 2-layer MEA | 21: GDL |
| 22: GDE | |

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 5:
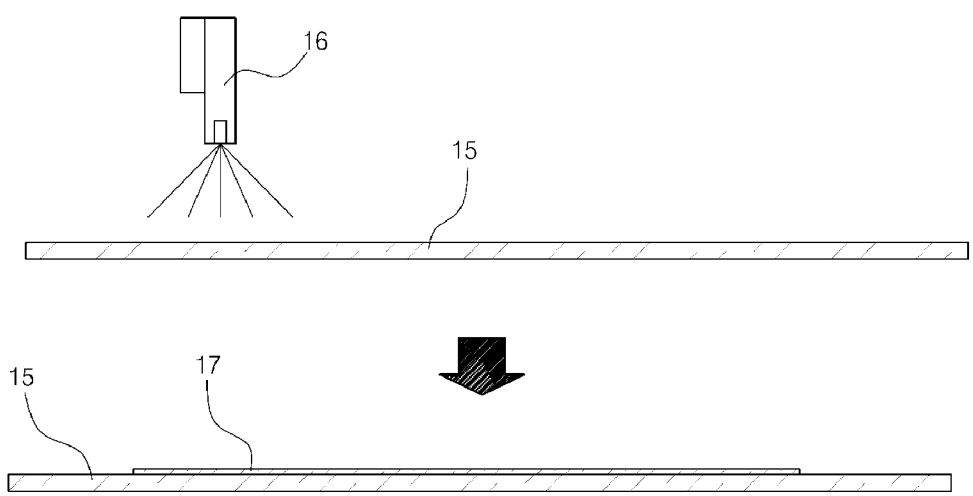
FIGS. 5 and 6 are flow diagrams illustrating a process of manufacturing a 2-layer MEA in which an electrolyte membrane is bonded to a catalyst electrode layer in a manufacturing method in accordance with a preferred embodiment of the present invention.
Figure 6:
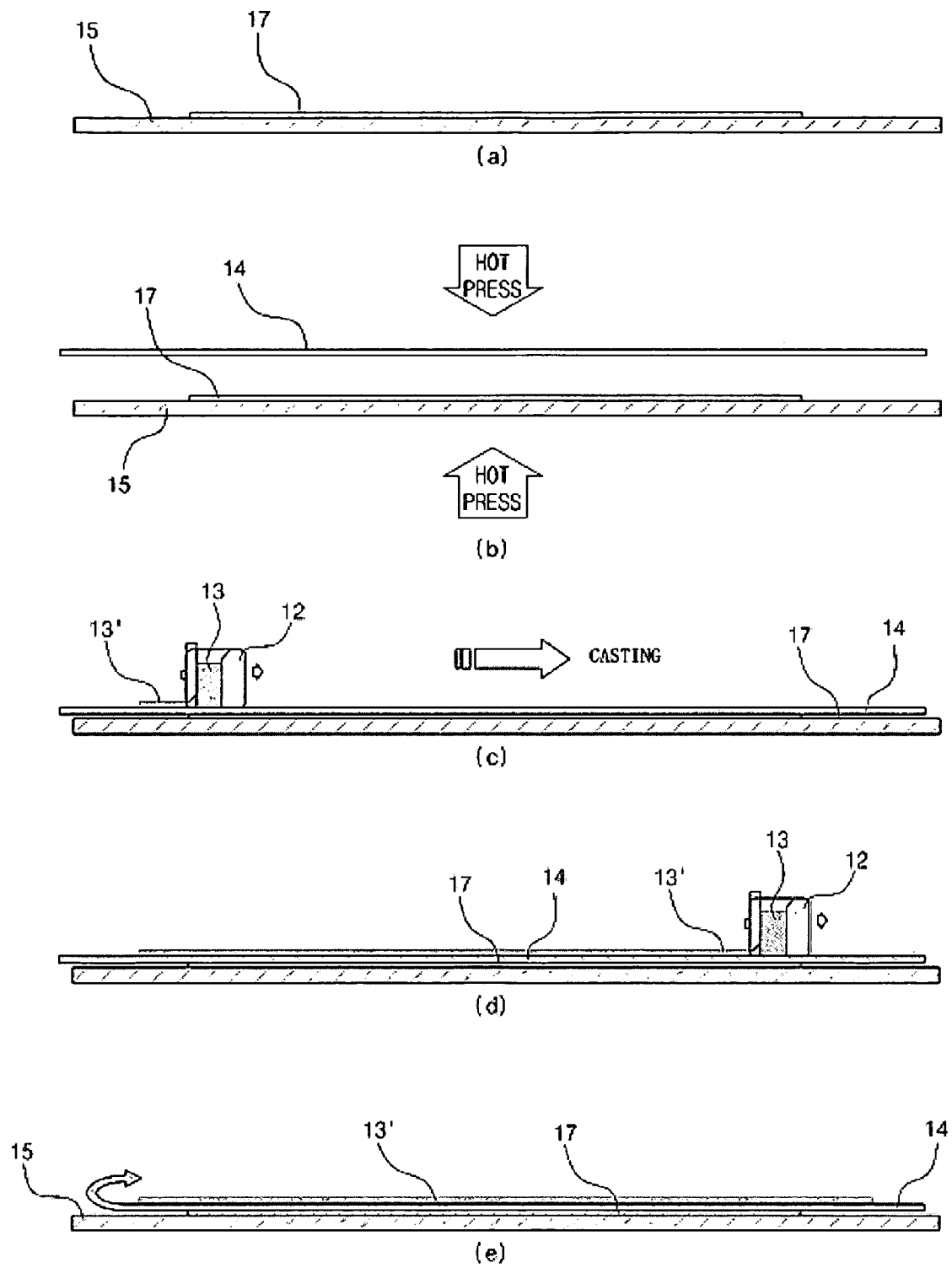

FIGS. 5 and 6 are flow diagrams illustrating a process of manufacturing a 2-layer MEA in which an electrolyte membrane is bonded to a catalyst electrode layer in accordance with a preferred embodiment of the present invention.

First, as shown in FIG. 5, a binder 17 is spray-coated on the surface of a polymer film 15 using a spray gun 16.

Suitably, the polymer film 15 is formed of a material selected from the group consisting of polyethyleneterephthalate, polyvinylchloride, polyimide, poly(aryl-ether-ether-ketone), polyurethane, polysulfone, and polytetrafluoroethylene (trade name: Teflon).

Preferably, the binder 17 is formed of a material selected from the group consisting of perfluorosulfonic acid (trade name: Nafion), polytetrafluoroethylene, perfluorocarboxylic acid, sulfonated poly(aryl-ether-ether-ketone), sulfonated polysulfone, and sulfonated polyimide.

Next, as shown in FIG. 6B, an electrolyte membrane 14 is placed on the polymer film 15 with the binder 17 coated thereon and then subjected to a hot pressing process at about 100° C. to 150° C. for about 1 to 5 minutes, thus forming a film-membrane assembly in which the polymer film 15 is bonded to the electrolyte membrane 14 by the binder 17.

Subsequently, as shown in FIGS. 6C and 6D, a catalyst electrode layer 13' is formed by casting (bar-coating) a catalyst slurry 13 on the surface of the electrolyte membrane 14 of the thus formed film-membrane assembly.

That is, the catalyst slurry 13 is coated on the surface of the electrolyte membrane 14 using a casting knife or an applicator 12. Here, since the above components have a flat film surface and a micro-scale gap, the catalyst slurry 13 is passed through the gaps and coated by the thickness of the gap, thus forming the catalyst electrode layer 13' having a small thickness on the surface of the electrolyte membrane 14.

In this case, the catalyst slurry 13 is coated on the electrolyte membrane 14 in a constant thickness when the applicator 12 is moved in the casting direction in a state where the catalyst slurry 13 is placed on the surface of the electrolyte membrane 14, and the thickness of the coated catalyst slurry 13 can be adjusted by the applicator 12.

According to the conventional method, when the catalyst is coated on the surface of the membrane using the applicator, the membrane is in contact with the solvent contained in the catalyst to be swollen and wrinkled, and thus the catalyst comes off the membrane. However, according to the present invention, since the polymer film 15 and the electrolyte membrane 14 are bonded to each other by the binder 17, it is possible to prevent the electrolyte membrane 14 from being swollen and wrinkled by the solvent of the catalyst slurry 13.

Next, the film-membrane assembly in which the polymer film 15 and the electrolyte membrane 14 are bonded to each other is placed in an oven and dried at about 60° C. to 100° C. for about 1 to 5 minutes and, as shown in FIG. 6E, the electrolyte membrane 14 and the catalyst electrode layer 13' are separated from the polymer film 15, thus forming a 2-layer MEA.

Figure 9:
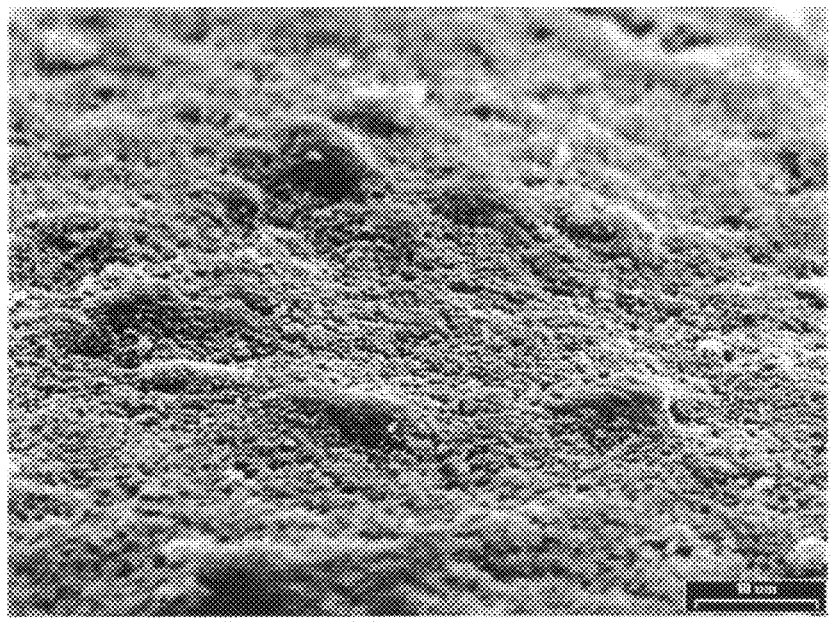
FIG. 9 is an SEM photograph of the surface of a 2-layer MEA manufactured by a bar coating method in accordance with the present invention.
Figure 10:
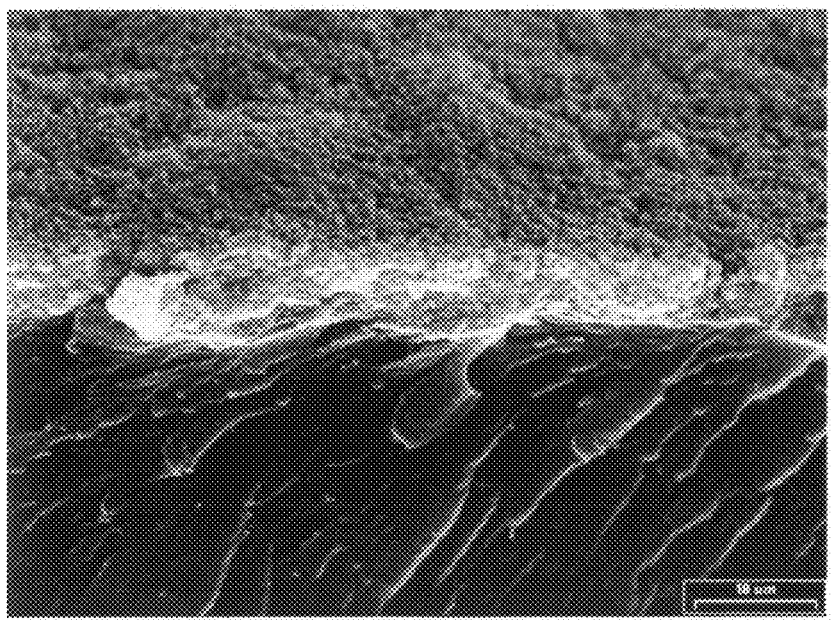
FIG. 10 is an SEM photograph of the section of the 2-layer MEA manufactured by a bar coating method in accordance with the present invention.

FIG. 9 is an SEM photograph of the surface of the 2-layer MEA manufactured by a bar coating method in accordance with the present invention, and FIG. 10 is an SEM photograph of the section of the 2-layer MEA.

Figure 7:
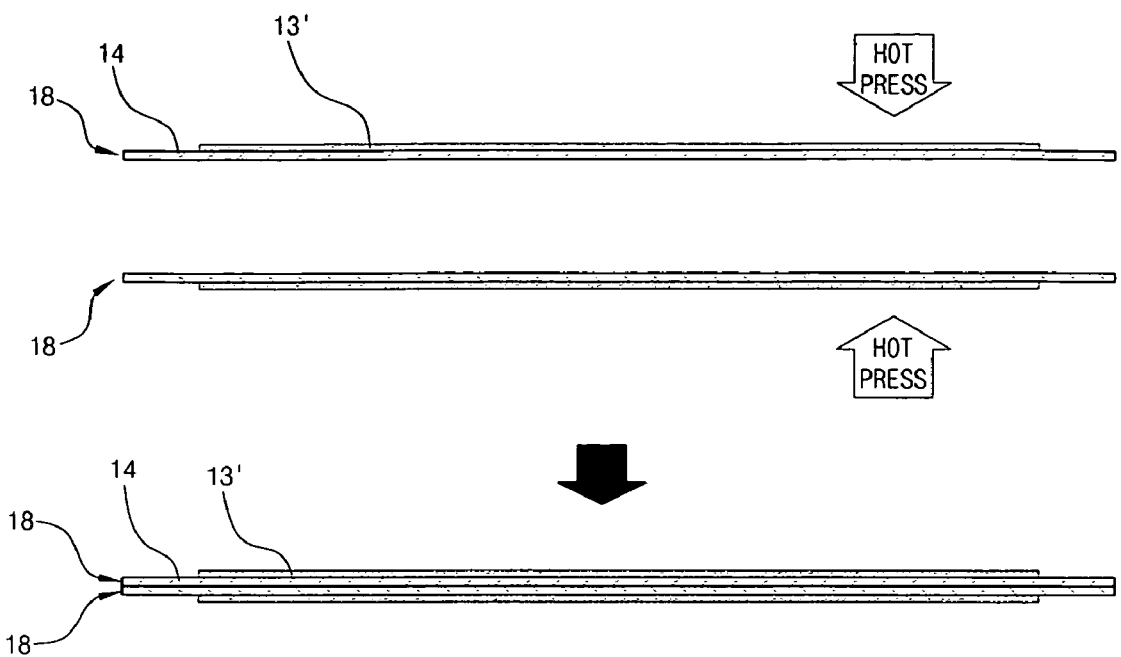
FIG. 7 is a schematic diagram illustrating a process of manufacturing a 3-layer MEA in accordance with a preferred embodiment of the present invention.

Using the thus formed 2-layered MEA, a 3-layer MEA or a 5-layer MEA can be manufactured. FIG. 7 is a schematic diagram illustrating a process of manufacturing a 3-layer MEA, and FIG. 8 is a schematic diagram illustrating a process of manufacturing a 5-layer MEA.

First, according to the process of manufacturing a 3-layer MEA, as shown in FIG. 7, two 2-layer MEAs 18 are stacked such that the electrolyte membranes 14 face each other and subjected to a hot pressing process to bond the two electrolyte membranes 14.

At this time, the hot pressing process is carried out at about 100° C. to 150° C. for about 1 to 5 minutes in a state where the two 2-layer MEAs 18 are stacked, thus forming a 3-layer MEA in which the catalyst electrode layer 13' is formed on both surfaces of the electrolyte membrane 14.

Figure 8:
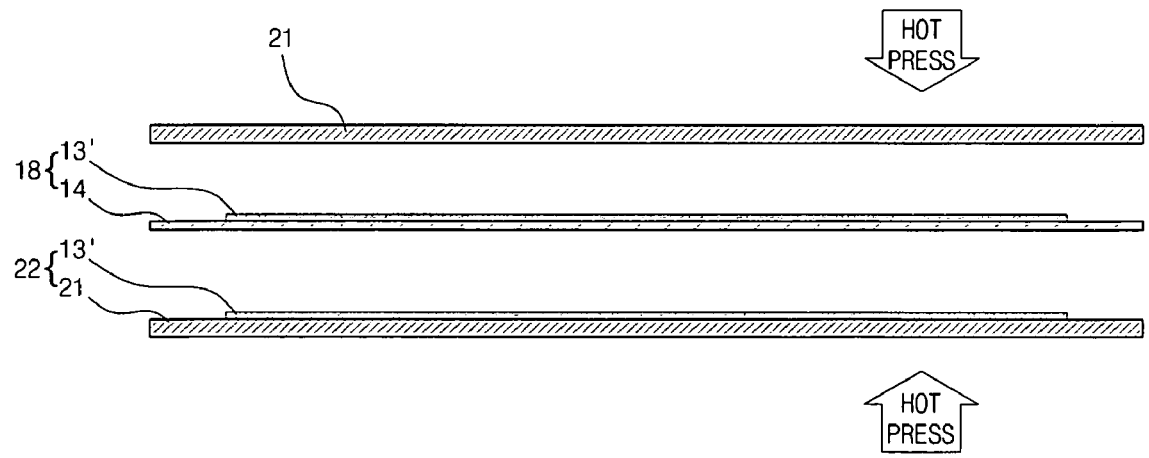
FIG. 8 is a schematic diagram illustrating a process of manufacturing a 5-layer MEA in accordance with a preferred embodiment of the present invention.

According to the process of manufacturing a 5-layer MEA, as shown in FIG. 8, the 5-layer MEA is manufactured using a GDL 21, a 2-layer MEA 18, and a GDE 22 in which a catalyst electrode layer 13' is formed on the surface of another GDL 21. That is, the 2-layer MEA formed by the-above described method is disposed between the GDL 21 and the GDE 22 and then subjected to a hot pressing process to be bonded to each other.

The hot pressing process is carried out at about 100° C. to 150° C. for about 1 to 5 minutes in a state where the 2-layer MEA 18 is disposed between the GDL 21 and the GDE 22 such that the catalyst electrode layer 13' of the GDE 22 is bonded to the electrolyte membrane 14 of the 2-layer MEA 18, thus forming a 5-layer MEA, in which the GDL 21, the catalyst electrode layer 13', the electrolyte membrane 14, the catalyst electrode layer 13' and the GDL 21 are stacked and fixed in the sequential order.

The GDE 22 is formed by spray-coating the catalyst slurry on one surface of the GDL 21 through the conventional method. At this time, although the catalyst slurry is inevitably spray-coated on the GDL 21, the catalyst slurry is not spray-coated on the electrolyte membrane, and thus it is possible to reduce the amount of catalyst slurry remarkably in the overall process, compared with the conventional method of manufacturing a 5-layer MEA.

Moreover, while the catalyst electrode layer in a solid phase is bonded to both surfaces of the electrolyte membrane by a hot pressing process in the conventional 5-layer MEA manufacturing process, the catalyst electrode layer 13' of the GDE 22 is bonded to one surface of the electrolyte membrane 14 by the hot pressing process (the catalyst electrode layer on the other surface of the electrolyte membrane 14 is bar-coated) in the present invention, and thus it is possible to increase the overall contact area between the catalyst electrode layer 13' and the electrolyte membrane 14 and reduce the interfacial resistance remarkably compared with the conventional 5-layer MEA.

As described above, according to the method of manufacturing a membrane-electrode assembly for a fuel cell, a binder is spray-coated on the surface of a polymer film, a catalyst slurry is bar-coated on the surface of an electrolyte membrane, bonded on the binder, to form a catalyst electrode layer, a bonded assembly of the electrolyte membrane and the catalyst electrode layer is separated from the polymer film, after a drying process, to obtain a 2-layer MEA, and the thus obtained 2-layer MEAs are used to form a 3-layer MEA or a 5-layer MEA by a hot pressing process.

Accordingly, the present invention provides the following effects:

1) It is possible to minimize the interfacial resistance between the catalyst electrode layer and the electrolyte membrane and reduce the manufacturing time, the loss of catalyst and the manufacturing cost, compared with the conventional 3-layer MEA manufacturing process, in which the catalyst slurry is spray-coated repeatedly, it takes a long processing time, and the loss of expensive catalyst is considerable;

2) Since the present invention does not employ the release film, i.e., the expensive polymer film used in the decal method, it is possible to reduce the manufacturing cost;

3) While the conventional 5-layer MEA manufacturing process employs two GDLs spray-coated with the catalyst slurry, the present invention employs one GDL that requires a spray coating, and thus it is possible to reduce the amount of catalyst slurry remarkably in the overall process; and 4) While the catalyst electrode layer in a solid phase is bonded to both surfaces of the electrolyte membrane by a hot pressing process in the conventional 5-layer MEA manufacturing process, the catalyst electrode layer of the GDE is bonded to one surface of the electrolyte membrane by the hot pressing process (the catalyst electrode layer on the other surface of the electrolyte membrane is bar-coated) in the present invention, and thus it is possible to increase the overall contact area between the catalyst electrode layer and the electrolyte membrane and reduce the interfacial resistance remarkably compared with the conventional 5-layer MEA.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane-electrode assembly for a fuel cell, the method comprising:
   spray-coating a binder on a surface of a polymer film;
   placing an electrolyte membrane on the binder-coated polymer film and then heating and compressing them to bond the electrolyte membrane to the polymer film by the binder;
   coating a catalyst slurry on a surface of the electrolyte membrane to form a catalyst electrode layer;
   separating a bonded assembly of the electrolyte membrane and the catalyst electrode layer from the polymer film, after a drying process, to obtain a 2-layer membrane-electrode assembly; and
   stacking two of the 2-layer membrane-electrode assemblies such that the electrolyte membranes thereof face each other and then heating and compressing them to form a 3-layer membrane-electrode assembly.

2. The method of claim 1, wherein the polymer film is formed of a material selected from the group consisting of polyethyleneterephthalate, polyvinylchloride, polyimide, poly(aryl-ether-ether-ketone), polyurethane, polysulfone, and polytetrafluoroethylene.

3. The method of claim 1, wherein the binder is formed of a material selected from the group consisting of perfluorosulfonic acid, polytetrafluoroethylene, perfluorocarboxylic acid, sulfonated poly(aryl-ether-ether-ketone), sulfonated polysulfone, and sulfonated polyimide.

4. A method of manufacturing a membrane-electrode assembly for a fuel cell, the method comprising:
   spray-coating a binder on a surface of a polymer film;
   placing an electrolyte membrane on the binder-coated polymer film and, then, heating and compressing them to bond the electrolyte membrane to the polymer film by the binder;
   coating a catalyst slurry on a surface of the electrolyte membrane to form a catalyst electrode layer;
   separating a bonded assembly of the electrolyte membrane and the catalyst electrode layer from the polymer film, after a drying process, to obtain a 2-layer membrane-electrode assembly; and
   disposing the 2-layer membrane-electrode assembly between a gas diffusion layer and a gas diffusion electrode prepared by stacking a catalyst electrode layer on a surface of another gas diffusion layer and then heating and compressing them to form a 5-layer membrane-electrode assembly.

5. The method of claim 4, wherein the polymer film is formed of a material selected from the group consisting of polyethyleneterephthalate, polyvinylchloride, polyimide, poly(aryl-ether-ether-ketone), polyurethane, polysulfone, and polytetrafluoroethylene.

6. The method of claim 4, wherein the binder is formed of a material selected from the group consisting of perfluorosulfonic acid, polytetrafluoroethylene, perfluorocarboxylic acid, sulfonated poly(aryl-ether-ether-ketone), sulfonated polysulfone, and sulfonated polyimide.

* * * * *